(12) United States Patent
Newman

(10) Patent No.: US 6,659,480 B1
(45) Date of Patent: Dec. 9, 2003

(54) SKATE BOARD BRAKE

(76) Inventor: Benjamin John Newman, 79 Cleopatra Street, Palmyra, Western Australia 6157 (AU)

( * ) Notice: Subject to any disclaimer, the term of this patent is extended or adjusted under 35 U.S.C. 154(b) by 0 days.

(21) Appl. No.: 10/048,256

(22) PCT Filed: Jul. 27, 2000

(86) PCT No.: PCT/AU00/00892

§ 371 (c)(1),
(2), (4) Date: Jan. 28, 2002

(87) PCT Pub. No.: WO01/08759

PCT Pub. Date: Feb. 8, 2001

(30) Foreign Application Priority Data

Jul. 28, 1999 (AU) .......................................... PQ 1855

(51) Int. Cl.[7] .............................................. A63C 17/14
(52) U.S. Cl. .............................. 280/87.042; 280/11.27; 301/5.301; 188/74
(58) Field of Search .................... 280/87.01, 87.021, 280/87.041, 87.042, 11.27, 11.28, 11.204, 11.211, 11.214, 11.215, 33.991; 188/18 A, 72.6, 74; D21/765; 301/5.301, 5.309, 110.6

(56) References Cited

U.S. PATENT DOCUMENTS

| 2,953,389 | A | * | 9/1960 | Green et al. ........... 280/87.042 |
| 4,037,852 | A | * | 7/1977 | Bayer et al. ........... 280/87.042 |
| 4,061,348 | A | | 12/1977 | Carter |
| 4,084,831 | A | * | 4/1978 | Akonteh et al. ....... 280/11.215 |
| 4,092,033 | A | | 5/1978 | Swain |
| 4,134,599 | A | * | 1/1979 | DiMille et al. .......... 280/87.01 |
| 4,181,316 | A | * | 1/1980 | Brand et al. ........... 280/11.207 |
| 4,183,546 | A | * | 1/1980 | Heilig ................... 280/87.042 |
| 4,295,547 | A | * | 10/1981 | Dungan ...................... 188/2 R |
| 4,951,958 | A | | 8/1990 | Chao et al. |
| 5,131,511 | A | * | 7/1992 | Appleberry ................. 188/176 |
| 5,351,974 | A | | 10/1994 | Cech |
| 5,947,495 | A | | 9/1999 | Null et al. |
| 6,007,074 | A | | 12/1999 | Tarng |
| 6,488,296 | B2 | * | 12/2002 | Ireton .................... 280/87.042 |

FOREIGN PATENT DOCUMENTS

| DE | 2721927 A | 11/1978 |
| EP | 0 744 198 A2 | 11/1996 |
| EP | 0 744 198 A3 | 12/1996 |
| GB | 2 002 243 A | 2/1979 |

* cited by examiner

Primary Examiner—Brian L. Johnson
Assistant Examiner—Brian L. Swenson
(74) Attorney, Agent, or Firm—Pearne & Gordon LLP

(57) ABSTRACT

A braking apparatus for a skateboard (10) having an axle (36), wherein a braking member (42) is disposed about the axle (36), and is actuated by an actuating device (44) to engage with a wheel mounting assembly (92) of the skateboard (10) so as to effect braking of the skateboard (10).

24 Claims, 5 Drawing Sheets

SKATE BOARD BRAKE

FIELD OF THE INVENTION

The present invention relates to a braking apparatus for a wheeled recreational riding board apparatus, for instance a skateboard.

Skateboards of the type including a board for supporting a user, a front wheel assembly connected to an underside of the board and a rear wheel assembly connected to an underside of the board are known and have been used as toys by children and, more recently, for recreational and sporting purposes by adults.

However, such skateboards have generally suffered from a disadvantage in that the skateboards do not include an arrangement for safe and readily controllable braking.

The present invention seeks, among other things, to overcome the above mentioned disadvantage.

SUMMARY OF THE PRESENT INVENTION

In accordance with a first aspect of the present invention, there is provided a braking apparatus for a wheeled recreational riding board apparatus, characterised in that it comprises a wheel mounting assembly arranged to rotate about an axle of the board apparatus, the wheel mounting assembly having a first braking surface, and a braking member disposed about the axle and being arranged to move along the axle, the braking member having a second braking surface, wherein the first and second braking surfaces are relatively rotatable, in use, and wherein contact of the first braking surface and the second braking surface whilst the wheel mounting assembly is rotating about the axle of the board causes braking to be effected.

In accordance with a second aspect of the present invention, there is provided a braking apparatus for a wheeled recreational riding board apparatus, characterised in that it comprises a wheel mounting assembly arranged to rotate about an axle of the board apparatus, the braking apparatus having at least one braking surface and a braking member, and a rider operated actuating means being provided which is, in use, arrange to be manipulated in more than one direction in order to operate the actuation means, and wherein operation of the actuation means when the wheel mounting assembly is rotating about the axle causes braking to be effected.

BRIEF DESCRIPTION OF THE DRAWINGS

The present invention will now be described, by way of example, with reference to the accompanying drawings, in which.

DESCRIPTION OF THE INVENTION

Figure 1:
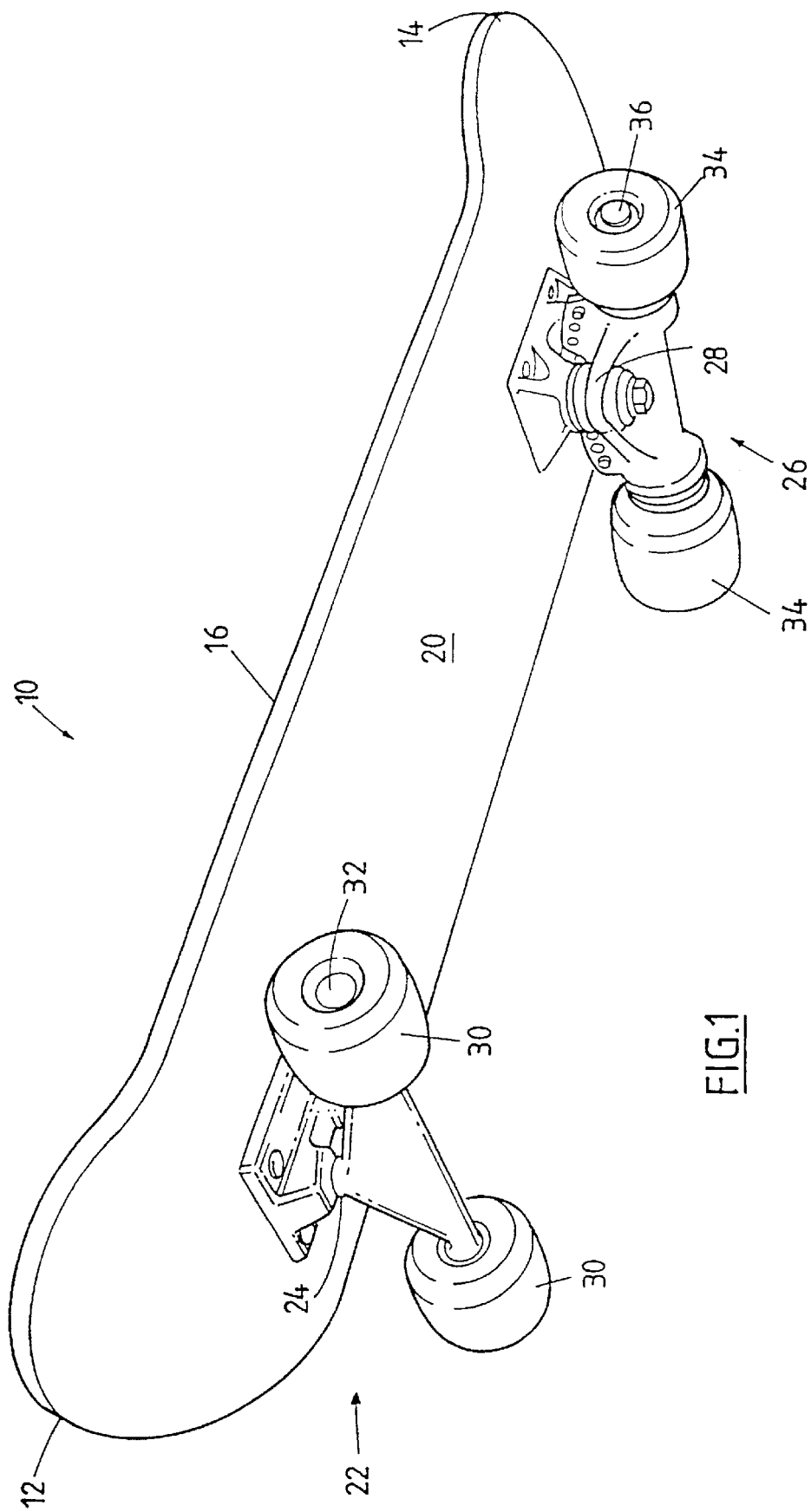
FIG. 1 is a diagrammatic lower perspective view of a skateboard including a braking apparatus in accordance with the present invention.

Referring to the drawings, there is shown a skateboard 10 having a front end 12 and a rear end 14.

The skateboard 10 includes a board member 16 having an upper surface 18 and a lower surface 20, a front wheel assembly 22 flexibly connected to the board member 16 at a first pivot joint 24, and a rear wheel assembly 26 flexibly connected to the board member 16 at a second pivot joint 28.

The front wheel assembly 22 includes two front wheels 30 mounted on a front axle 32 such that the front wheels 30 are rotatable in use. The rear wheel assembly 26 includes two rear wheels 34 mounted on a rear axle 36 such that the rear wheels 34 are rotatable in use.

Figure 2:
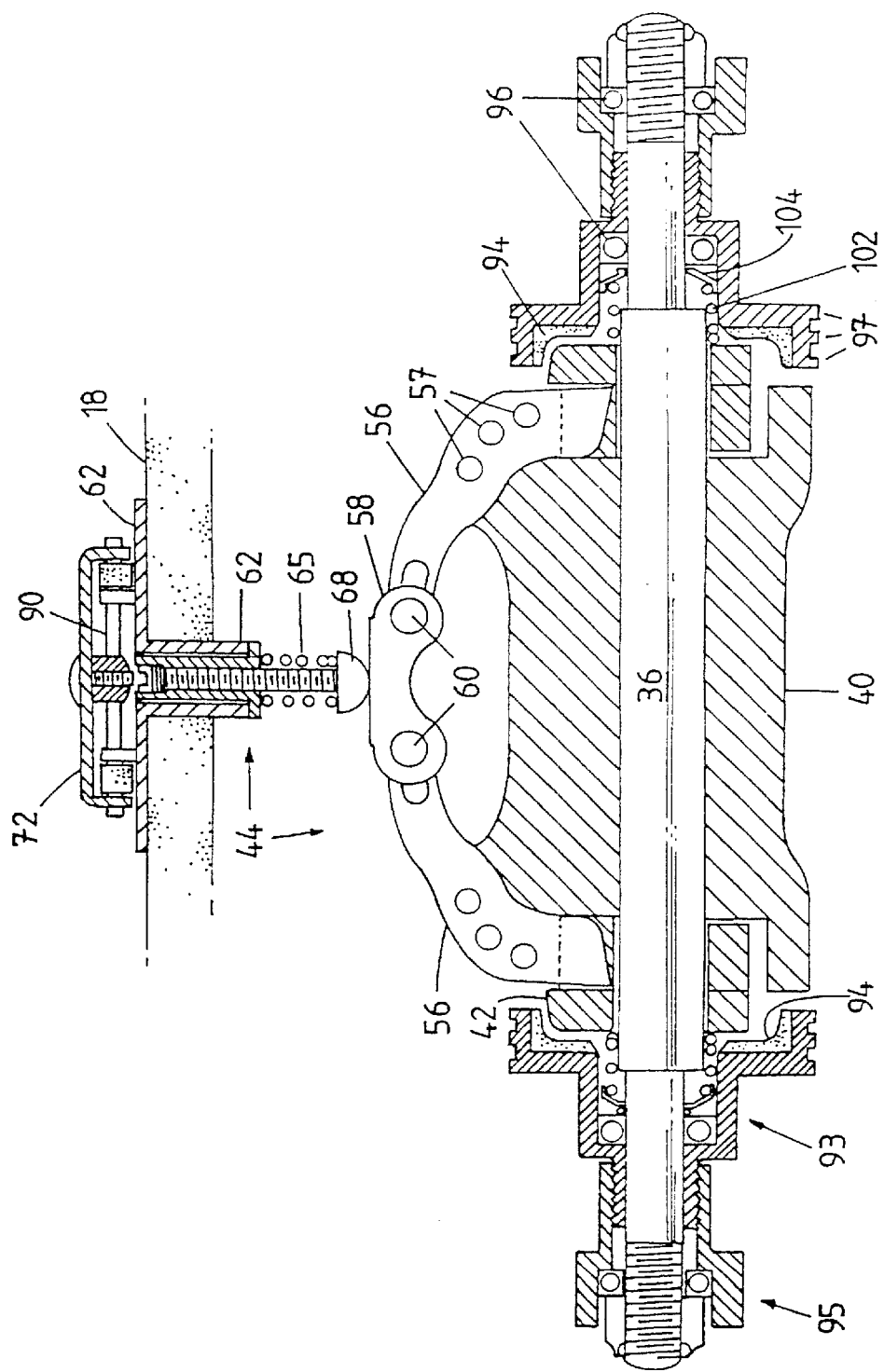
FIG. 2 is a diagrammatic transverse cross-sectional view of portions of the skateboard shown in FIG. 1 including the braking apparatus in accordance with the present invention.

Incorporated into the rear wheel assembly 26 is a braking apparatus in accordance with the present invention. The braking apparatus is shown more particularly in FIGS. 2, 3 and 4. The braking apparatus includes a housing portion 40, two wheel portions 46 mounted on the rear axle 36, two braking members 42 slidably mounted on the rear axle 36 and reciprocably movable along the rear axle 36, and actuating means 44 which, when actuated by a user, urges the braking members 42 to move substantially parallel to the rear axle 36 away from each other and towards wheel portions 46 of the skateboard 10.

Each braking member 42 is annularly disposed around the rear axle 36, and includes a generally cylindrical first portion 48 having a notched portion 50 for facilitating engagement with the actuating means 44 and a flattened side surface 53 disposed oppositely the notched portion 50. Each braking member 42 further includes a generally cylindrical second portion 52 having an outwardly facing circumferential braking surface 54 which tapers downwardly towards the adjacent wheel portion 46 and a flattened side surface 55 which co-operates with the side surface 53 to form a flattened base portion of the braking member 42.

The actuating means 44 includes two actuating levers 56 of generally L-shaped configuration, a generally central portion of each actuating lever 56 being pivotably mounted to the housing portion 40 at one of a plurality of adjacent pivot connections 57. An outer end of each actuating lever 56 is engaged with a notched portion 50 of a braking member 42 so as to restrict rotation of the braking member 42 relative to the adjacent wheel portion 46. The two actuating levers 56 are flexibly connected together by an elongate link portion 58, longitudinal ends of the link portion 58 being connected to inner ends of the actuating levers 56 by sliding pivot connections 60.

The actuating means 44 also includes a collar member 62 extending downwardly from the board member 16, and an actuator 64 having an actuating member 66, a rod member 68 and a biasing spring 65. The actuating member 66 includes an internally screw threaded recessed portion adapted to engage with an externally screw threaded portion of the rod member 68. The biasing spring 65 acts between the actuating member 66 and the rod member 68, and is biased so as to impede the retraction of the rod member 68 into the actuating member 66.

The actuating means 44 also includes an triggering mechanism comprising a lower pedal portion 70 and an upper pedal portion 72 slidable and pivotable relative to the lower pedal portion 70. The upper pedal portion 72 and the lower pedal portion 74 are shown more particularly in FIG. 4.

The lower pedal portion 70 is fixed to the upper surface 18 of the board member 16 by any suitable fixing means, for example by screws 74. The lower pedal portion 70 includes a first aperture 76 which is aligned with the collar member 62 and thereby with the actuating member 66, elongate second apertures 78 for facilitating slidable and pivotable movement of the upper pedal portion 72 relative to the lower pedal portion 70, and a back plate 80.

The upper pedal portion 72 includes third apertures 84 located, in use, adjacent the elongate second apertures of the lower pedal portion 70, and a fourth aperture 88 disposed along a longitudinal axis of the upper pedal portion 72. The upper pedal portion 72 further includes a bolt 83 arranged to extend through the fourth aperture 88, and a nut 86 of substantially hemispherical configuration, the nut 86 being affixed to the bolt 83 adjacent a lower surface of the upper pedal portion 72.

A pin 90 is provided for connecting the lower pedal portion 70 and the upper pedal portion 72 together, the pin 90 passing through the second apertures 78 and the third apertures 84 so as to thereby facilitate slidable and pivotable movement of the upper pedal portion 72 relative to the lower pedal portion 70. Elongate washers 77 are provided between the elongate second apertures 78 and the third apertures 84.

It will be understood that in a first pedal position wherein the pin 90 locates in a position relatively remote from the back plate 80, the bolt 83 is not aligned with the first aperture 76 or the actuating member 66. As a result, downward pressure on the upper pedal portion 72 by a user does not effect downward movement of the actuating member 66.

It will also be understood that in a second position wherein the pin 90 locates in a position relatively adjacent the back plate 80, the bolt 83 is substantially aligned with the first aperture 76 and thereby with the actuating member 66. As a result, downward pressure on the upper pedal portion 72 by a user causes the nut 86 to move in a downwardly direction, to contact the actuating member 66 and thereby to cause the actuating member 66 to move in a downwardly direction.

Also provided is a biasing member in the form of a first spring 91 which biases the upper pedal portion 72 towards the first position.

Figure 3:
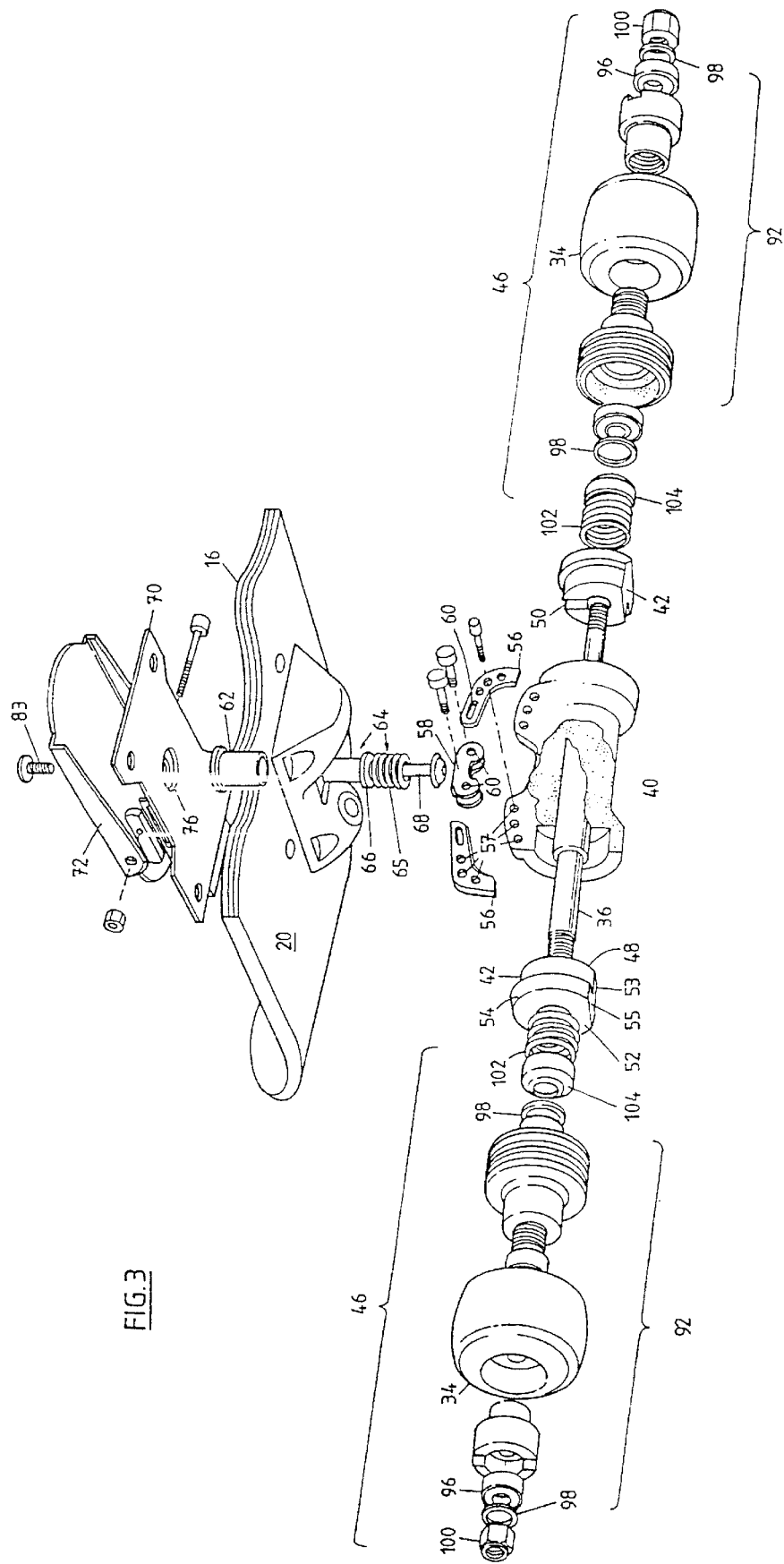
FIG. 3 is a diagrammatic exploded perspective view of portions of the skateboard including the braking apparatus shown in FIG. 2.
Figure 4:
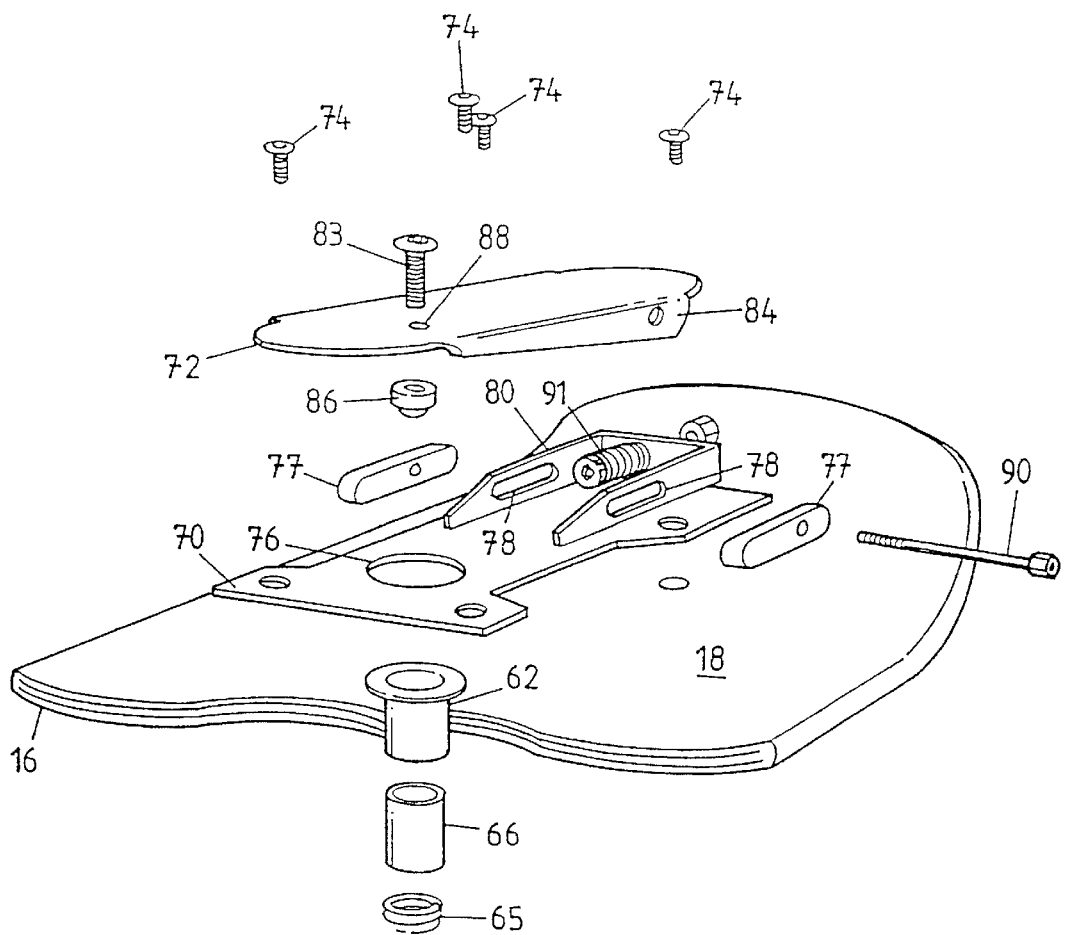
FIG. 4 is a further diagrammatic exploded perspective view of a portion of the braking apparatus shown in FIGS. 2 and 3.
Figure 5:
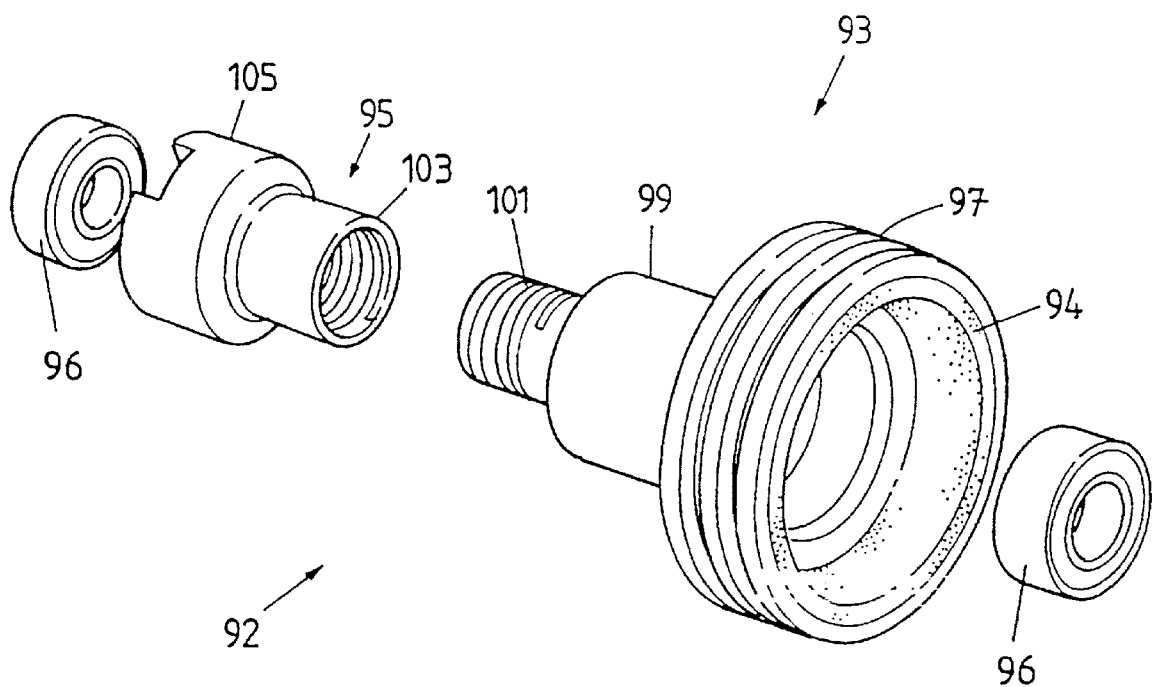
FIG. 5 is a diagrammatic exploded perspective view of a wheel mounting assembly of the braking apparatus shown in FIGS. 2 and 3.

Each wheel portion 46, shown more particularly in FIG. 3, includes a wheel mounting assembly 92 which is adapted to carry a rear wheel 34. Each wheel mounting assembly 92, shown more particularly in FIG. 5, includes a first wheel locating member 93 and a second wheel locating member 95. The first wheel locating member 93 includes a ribbed portion 97 featuring a plurality of radially extending ribs, a first wheel mounting portion 99 and an externally threaded locking portion 101. The second wheel locating member 95 includes a second wheel mounting portion 103 which is threaded internally and an abutment portion 105. In use, a wheel 34 is arranged to be mounted on the first and second wheel mounting portions 99, 103 such that the externally threaded portion 101 is engaged within the second wheel mounting portion 103. The axial sides of the wheel 34 are thus restrained between the ribbed portion 97 and the abutment portion 105. Each wheel mounting assembly 92 further includes bearings 96 for facilitating rotation of the respective wheel mounting assembly 92 and thereby the respective rear wheel 34. The ribbed portion 97 of the first wheel locating member 93 includes an inwardly facing circumferential braking surface 94 which locates, in use, adjacent an outwardly facing circumferential braking surface 54 of a braking member 42. Each wheel portion 46 also includes washers 98 and a wheel nut 100 for fixing the respective wheel portion 46 on the rear axle 36.

Also provided are second springs 102 for biasing the braking members 42 towards each other and thereby the actuating member 66 in an upwardly direction. The second springs 102 are disposed annularly about the rear axle 36 adjacent the second cylindrical portion of the braking member 42. The second springs 102 are restrained at an end remote of the braking member 42 by an end cap 104 which locates, in use, adjacent a washer 98 of the wheel portion 46.

In use, a rider of the skateboard stands on the upper surface 18 of the board member 16 so that feet of the user extend in a direction substantially parallel to the rear axle and one foot lies on or adjacent to the upper pedal portion 72. It will be appreciated that since the upper pedal portion 72 is biased towards the first position wherein the bolt 83 is not aligned with the first aperture 76, and the braking members 42 are biased away from the wheel mounting assemblies 92, the rear wheels 34 are free to move substantially free of restriction.

When the rider decides to reduce the speed of movement of the skateboard 10, the user moves the foot located on or adjacent the upper pedal portion 72 so as to cause the pedal portion 72 to move towards the second position wherein the bolt 83 is aligned with the actuating member 66, and the rider generates a downward force on the upper pedal portion 72. As a result, the upper pedal portion 72 pivots and the bolt 83 and the nut 86 moves in a downwardly direction towards the actuating member 66. This, in turn, causes the actuating member 66 to move in a downwardly direction through the collar member 62, the link portion 58 to move in a downwardly direction, each of the actuating levers 56 to rotate about a pivot connection 57 in a first rotational direction, and the braking members 42 to move away from each other. As a result, the outwardly facing circumferential braking surfaces 54 of the braking members 42 contact the inwardly facing circumferential braking surfaces 94 of the wheel mounting assemblies 92 and braking of the wheel mounting assemblies 92 and thereby of the rear wheels 34 is effected.

Once satisfactory braking has been achieved, the rider releases the downward force from the upper pedal portion 72 so as to cause the upper pedal portion 72 by virtue of the first spring 91 to return to the first position whereby the bolt 83 is not aligned with the first aperture 76. As a result, the second spring 102 urges the braking members 42 to move towards each other, the actuating levers 56 to rotate about the pivot connections 57 in a second rotational direction opposite to the first rotational direction, the link portion 58 to move in an upwardly direction and the actuator member 66 to move in an upwardly direction.

It will be understood that the degree of braking achieved by the above described downward movement of the actuating member 66 is adjustable by adjusting the position of the rod member 68 relative to the actuating member 66, and by varying the choice of pivot connection 57.

It will be appreciated that although the above embodiment of the invention has been described in relation to an outwardly facing braking surface provided on each braking member 42 and an inwardly facing braking surface provided on each wheel mounting assembly 92, a similar function could be achieved by alternatively providing each braking member 42 with an inwardly facing braking surface and providing each wheel mounting assembly 92 with a corresponding outwardly facing braking surface.

It will also be appreciated that the invention is also applicable to other recreational articles having the general configuration of a board supported by pairs of wheels, such other articles including street luges wherein a rider lies on the board in use. With this type of article the upper pedal portion 72 is actuated by a hand of a rider instead of a foot.

It will also be appreciated that instead of providing an upper pedal portion 72 which is slidable between the first position and the second position, the upper pedal portion may alternatively be pivotable about a substantially vertical axis between a first position wherein braking cannot occur and a second position wherein braking can be effected.

Furthermore, it will be appreciated that although the above embodiment has been described in relation to a braking apparatus provided at a rear portion of a skateboard or like article, the braking apparatus may alternatively be provided at a front portion of the skateboard or like article.

Modifications and variations as would be apparent to a skilled addressee are deemed to be within the scope of the present invention.

What is claimed is:

1. A braking apparatus for a wheeled recreational riding board apparatus, characterised in that it comprises a wheel mounting assembly arranged to rotate about an axle of the board apparatus, the wheel mounting assembly having a first braking surface and a braking member disposed about the axle and being arranged to move along the axle, the braking member having a second braking surface, the first and second braking surfaces being relatively rotatable, in use, the braking apparatus further comprising a rider operated actuator associated with the braking member whereby operation of the actuator, in use, by a rider causes the braking member to move towards the wheel mounting assembly, thus causing the second braking surface to contact the first braking surface causing braking to be effected, the actuator being operated by the manipulation of a trigger, and wherein the trigger must be manipulated in more than one direction in order to operate the actuator.

2. A braking apparatus as claimed in claim 1, characterised in that the braking member includes a notched portion wherein the actuator engages with the notched portion to prevent axial rotation of the braking member.

3. A braking apparatus according to claim 1, characterised in that the triggering mechanism is resiliently biased towards a first position in which the actuator is not operative.

4. A braking apparatus according to claim 1, characterised in that the first braking surface and the second braking surface are each substantially frusto-conical in shape.

5. A braking apparatus according to claim 1, characterised in that the braking member includes a flattened base portion.

6. A braking apparatus according to claim 1, characterised in that the wheel mounting assembly includes a plurality of circumferentially outwardly extending ribs.

7. A braking apparatus according to claim 1, characterised in that the wheel mounting assembly comprises a first wheel locating member and a second wheel locating member, wherein, in use, the first wheel locating member and the second wheel locating member co-operate to form a circumferentially extending recess in which a wheel is located.

8. A braking apparatus according to claim 1, characterised in that the actuator includes at least one lever arranged to rotate about a pivot point in order to translate a downward force on the actuator by a rider into an axial force on the braking member.

9. A braking apparatus according to claim 8, characterised in that the actuator or each lever is arranged to rotate about one of a plurality of pivot points whereby a user can select a particular pivot point in order to control the available braking force.

10. A braking apparatus according to claim 8, characterised in that the actuator includes two levers and a link portion, wherein each lever is slidingly connected to the link portion in order to allow relative movement of the levers in only one direction.

11. A braking apparatus according to claim 10, characterised in that the actuator includes a rod member extending downwardly between a first end adjacent a board member of the board apparatus and a second end adjacent the link portion, whereby operation of the actuator, in use, by the rider causes the rod member to provide a downwards force on the link portion, thus causing rotation of the levers about their respective pivot points.

12. A braking apparatus for a wheeled recreational riding board apparatus, the braking apparatus comprising a braking member which is selectively activated by an actuator, the actuator being operatively associated with a trigger which is operable by a user, whereby operation of the trigger by the user causes the braking member to be activated by the actuator and to apply a braking force to the riding board apparatus, and wherein the operation of the trigger must include movement of the trigger in a direction substantially parallel to an upper surface of the riding board, wherein the braking apparatus further comprises a wheel mounting assembly arranged to rotate about an axle of the board apparatus, the wheel mounting assembly having a first braking surface, and wherein the braking member is disposed about the axle and is arranged to move along the axle, the braking member having a second braking surface such that the first and second braking surfaces are relatively rotatable, in use, and contact of the first braking surface and the second braking surface whilst the wheel mounting assembly is rotating about the axle of the board causes braking to be effected, the braking member includes a notched portion whereby the actuator engages with the notched portion to prevent axial rotation of the braking member.

13. A braking apparatus according to claim 12, characterised in that operation of the trigger also must include movement of the trigger in another direction.

14. A braking apparatus according to claim 12, characterised in that the trigger is resiliently biased toward a first position in which the actuator is not operative.

15. A braking apparatus according to claim 12, characterised in that the first braking surface and the second braking surface are each substantially frusto-conical in shape.

16. A braking apparatus according to claim 12, characterised in that the wheel mounting assembly includes a plurality of circumferentially outwardly extending ribs.

17. A braking apparatus according to claim 12, characterised in that the braking member includes a flattened base portion.

18. A braking apparatus according to claim 12, characterised in that the wheel mounting assembly comprises a first wheel locating member and a second wheel locating member, wherein, in use, the first wheel locating member and the second wheel locating member cooperate to form a circumferentially extending recess in which a wheel is located.

19. A braking apparatus according to claim 18, characterised in that the first wheel locating member includes an externally threaded portion aligned with the axle, and the second wheel locating member includes an internally threaded portion, aligned with the axle wherein, in use, the externally threaded portion engages the internally threaded portion to restrain movement of the first wheel locating member relative to the second wheel locating member.

20. A braking apparatus according to claim 12, characterised in that the actuator includes at least one lever arranged to rotate about a pivot point in order to translate a downward force on the actuating means by a rider into an axial force on the braking member.

21. A braking apparatus according to claim 20, characterised in that the actuator or each lever is arranged to rotate about one of a plurality of pivot points wherein a user can select a particular pivot point in order to control the available braking force.

22. A braking apparatus according to claim 20, characterised in that the actuator includes two levers and a link portion, wherein each lever is slidingly connected to the link portion in order to allow relative movement of the levers in only one direction.

23. A braking apparatus according to claim 22, characterised in that the actuator includes a rod member extending downwardly between a first end adjacent a board member of the board apparatus and a second end adjacent the link portion, wherein operation of the actuator, in use, by the rider causes the rod member to provide a downwards force on the link portion, thus causing rotation of the levers about their respective pivot points.

24. A braking apparatus for a wheeled recreational riding board apparatus, characterised in that it comprises a wheel mounting assembly having a first wheel locating member and a second wheel locating member, the first wheel locating member and the second wheel locating member co-operating to form a circumferentially extending recess in which a wheel is located, the first wheel locating member including an externally threaded portion aligned with an axle associated with the wheel, and the second wheel locating member including an internally threaded portion aligned with the axle whereby, in use, the externally threaded portion engages the internally threaded portion to restrain movement of the first wheel locating member relative to the-second wheel locating member.

* * * * *